June 22, 1971  E. H. MUMFORD  3,586,494
BAFFLE MOVING AND ALIGNMENT MEANS
Filed Jan. 9, 1969  3 Sheets-Sheet 3

INVENTOR.
EUSTACE H. MUMFORD
ATTORNEYS

United States Patent Office 3,586,494
Patented June 22, 1971

3,586,494
BAFFLE MOVING AND ALIGNMENT MEANS
Eustace H. Mumford, Ottawa Lake, Mich., assignor to Owens-Illinois Inc.
Filed Jan. 9, 1969, Ser. No. 790,005
Int. Cl. C03b 9/40
U.S. Cl. 65—323                             5 Claims

ABSTRACT OF THE DISCLOSURE

A glass forming machine wherein a plurality of charges of glass are delivered to a plurality of parison mold cavities and are formed into parisons after which the parisons are inverted and delivered to a blow mold at another station for forming the final article. Means are provided for moving the baffles vertically and horizontally substantially equal distances from their respective parison mold cavities.

---

This invention relates to glass forming machines.

BACKGROUND OF THE INVENTION

In one type of glass forming machine, more commonly known as individual section type of machine, the machine comprises a plurality of sections. Each section includes a parison mold to which a glass charge is delivered to be formed into a parison and after forming the parison is inverted and delivered to another station where a blow mold closes about the parison to form the final article. The forming of the parison at the parison forming station may be either by pressing or blowing.

Where a plurality of charges are formed in each section of the machine, substantial difficulty may be achieved in providing operating clearances between the various components of the machine. Accordingly, among the objects of the invention are to provide a machine which will produce a plurality of parisons simultaneously; wherein the operation can be effectively provided without interference of one part with another; wherein novel means are provided for supporting the baffles that close the open upper ends of the parison mold cavities at the parison forming station.

SUMMARY

A glass forming machine wherein a plurality of charges of glass are delivered to a plurality of parison mold cavities and are formed into parisons after which the parisons are inverted and delivered to a blow mold at another station for forming the final article. Means are provided for moving the baffles vertically and horizontally substantially equal distances from their respective parison mold cavities.

DESCRIPTION

Figure 1:
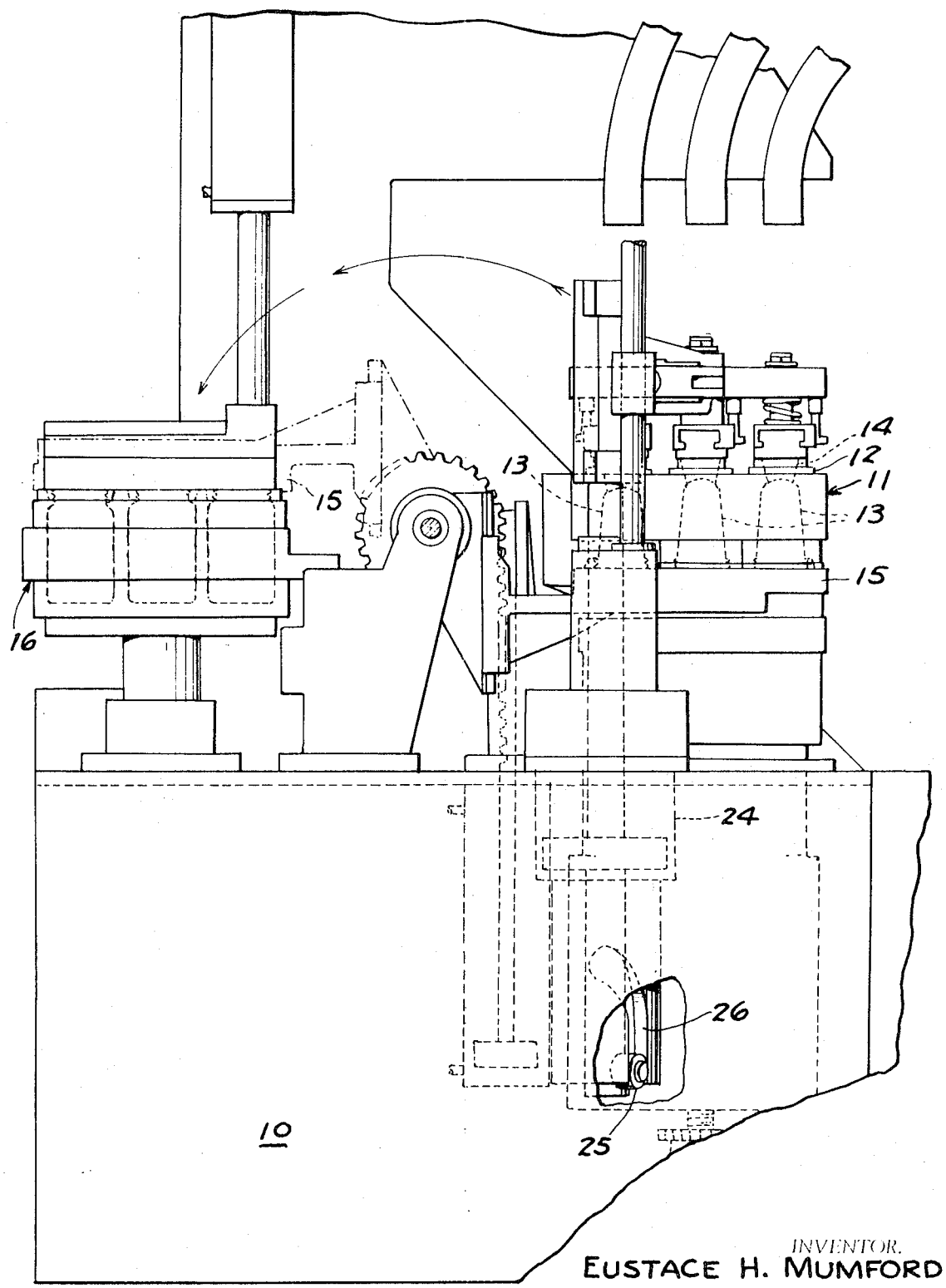
FIG. 1 is a partly diagrammatic elevational view of a machine embodying the invention.

Referring to FIG. 1, the machine embodying the invention comprises a base 10 which supports a blank mold assembly 11 having a plurality of parison molds 12, each of which has a mold cavity 13. Each parison mold 12 has an open upper end to which a charge of glass is delivered. Baffles 14 are moved to close the upper end of the mold and the parison is formed in the blank mold by pressing or blowing from below. After forming, the parisons are simultaneously inverted by a neck ring assembly 15 and transferred to a blow mold station wherein blow molds 16 are closed about the parisons and the parisons are blown to final form.

Figure 2:
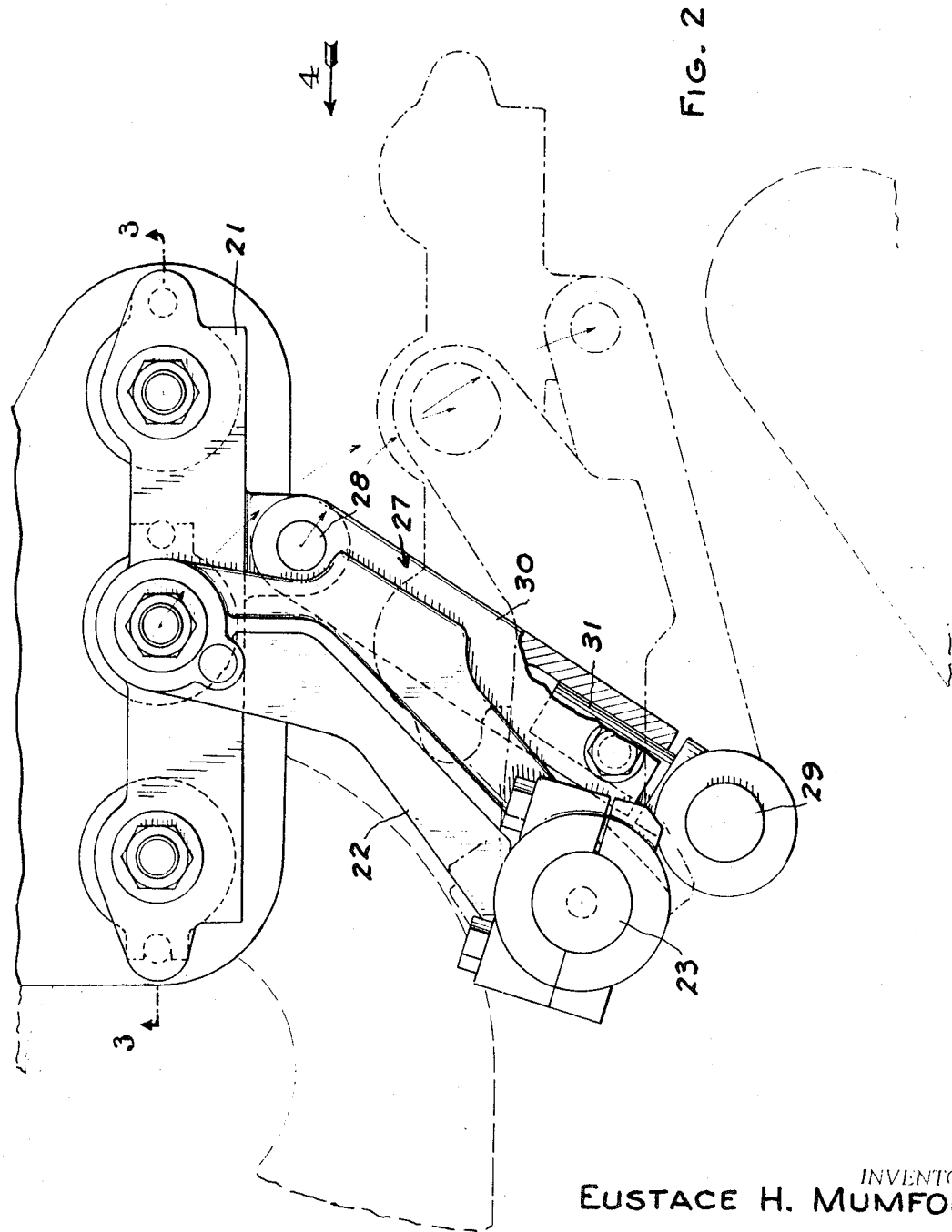
FIG. 2 is a part sectional fragmentary plan view of a portion of the machine shown in FIG. 1.
Figure 3:
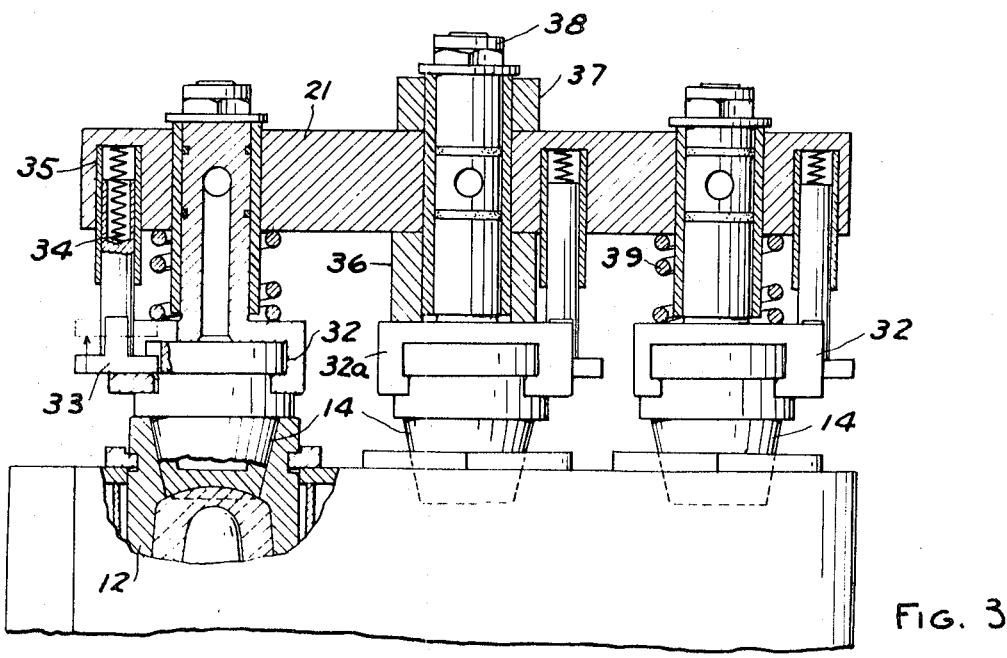
FIG. 3 is a fragmentary sectional view taken along the line 3—3 in FIG. 2.
Figure 4:
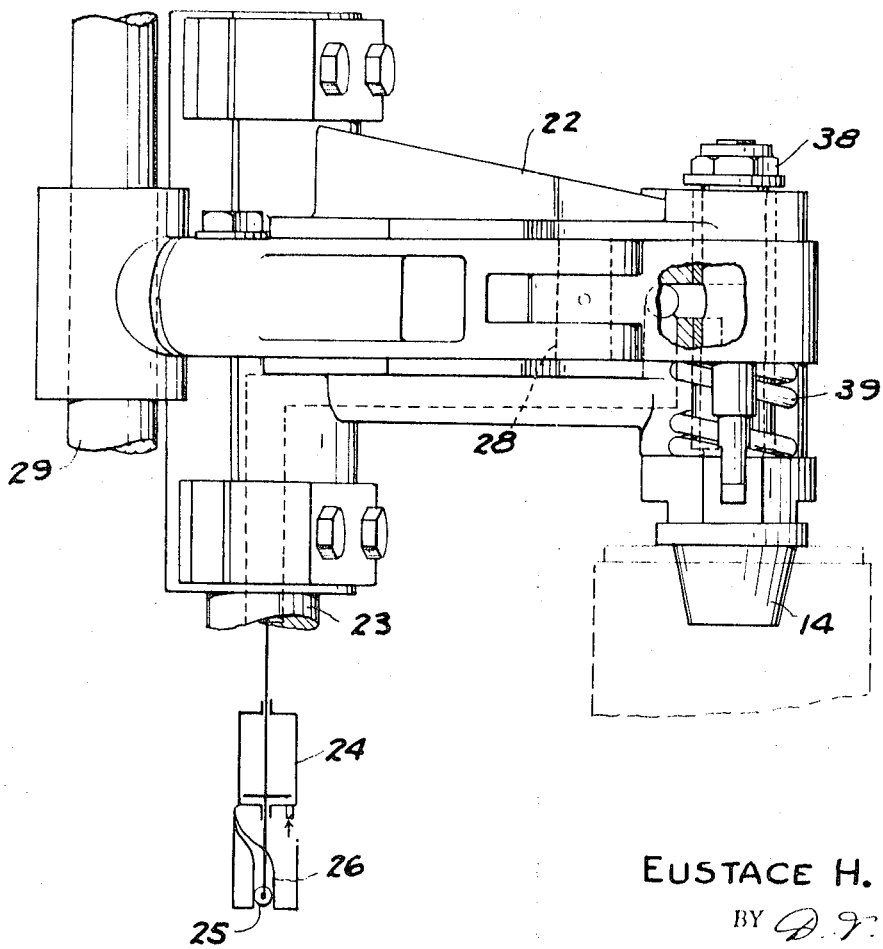
FIG. 4 is a fragmentary part sectional view taken in the direction of the arrow 4 in FIG. 2.

In accordance with the invention as shown in FIGS. 2–4, each of the baffles 14 is supported on a baffle holder 21 in a manner presently described. The baffle holder 21 is supported by a main support arm 22 which is pivoted to baffle holder 21 at one end about the axis of the center baffle 14 and is clamped at the other end to an operating shaft 23. The shaft 23 is adapted to be moved vertically by a cylinder 24 and simultaneously rotated by the vertical movement by cooperation of a roller 25 thereon with a fixed helical cam 26 (FIG. 1).

A connecting link 27 is pivoted to a pin 28 on the baffle holder and to a fixed shaft 29 parallel to the shaft 23. Specifically, the connecting link 27 comprises portions 30, 31 that are telescopically adjustable relative to one another. The arrangement of the links 22, 27 is such that the baffle holder 21 and, in turn, the baffles 14 are moved through planes substantially parallel to the plane containing the axes of the baffles 14. In other words, throughout any horizontal movement of the baffles 14, they are moved equal distances with respect to the cavities of their respective parison molds.

Referring to FIGS. 3 and 4, each baffle 14 received includes a post 32a extending upwardly through arm 21. Each baffle 14 is supported in a baffle support ring 32 which is locked in position against rotation by a spring-loaded key 33 yieldingly urged downwardly by a spring 34 telescoped within a cavity 35 of the baffle holder 21. The centermost baffle 32a is fixed against any vertical movement with respect to the baffle holder 21 by spacers 36, 37 and is clamped in position by a nut 38 threaded on the upper end 32a thereof. The other baffles 14 and their respective baffle rings 32 are mounted for yielding movement vertically to accommodate variations in height of their respective molds and insure that there is equalization of pressure with which the baffles are urged against their respective molds. Specifically, the ring 32 of each of these baffles is yieldingly urged downwardly by a spring 39 surrounding its respective post 32a interposed between the ring 32 and the underside of the baffle holder 21.

Where blow pressure is supplied to the upper end of each parison, appropriate passages can be provided in the upper ends 32a of rings 32 and baffles 14.

What is claimed is:

1. In a machine wherein a plurality of charges of glass are delivered to the mold cavities of an open-ended parison mold assembly at one station and are formed into a parison and thereafter the parisons are inverted and delivered to a blow mold at another station, the combination comprising
   a plurality of baffles for closing the open ends of cavities of the parison mold assembly,
   a baffle holder,
   means for supporting said baffles on said baffle holder,
   a generally vertical pivot shaft movable vertically and rotatable about its axis,
   and linkage means connecting said pivot shaft and said baffle holder such that rotation of said pivot shaft moves said baffle holder and said baffles substantially equal distances with respect to the respective mold cavities.

2. The combination set forth in claim 1 wherein said linkage means comprises
   a main support arm,
   said main support arm being pivotably mounted at one end to said baffle holder, said main support arm being fixedly connected to said pivot shaft whereby vertical movement of said pivot shaft will move said main support arm and said baffle holder vertically and rotation of said pivot shaft will swing said main support arm, a connecting link having one end thereof pivoted to said baffle holder in spaced relation to the end of the main support arm, and a second pivot shaft in spaced relation to said first pivot shaft to which the other end of said connecting link is pivoted such that said main support arm and said connecting link are substantially parallel.

3. The combination set forth in claim 2 wherein said connecting link is extensible and contractable for adjustment.

4. The combination set forth in claim 2 including means for moving said first pivot shaft vertically and for rotating said pivot shaft.

5. The combination set forth in claim 1 including means for supporting at least some of said baffles on said baffle holder for yielding movement with respect to said baffle holder and, in turn, with respect to the parison mold assembly.

References Cited

UNITED STATES PATENTS

| 799,332 | 9/1905 | Hartman | 65—361X |
| 1,942,832 | 1/1934 | Piazzoli Jr. | 65—361X |
| 3,189,427 | 6/1965 | Schirm | 65—359X |
| 3,374,079 | 3/1968 | Daly | 65—323X |
| 3,383,193 | 5/1968 | Bailey | 65—234 |
| 3,472,642 | 10/1969 | Irwin | 65—323X |
| 3,477,841 | 11/1969 | Fouse | 65—307 |

FRANK W. MIGA, Primary Examiner

U.S. Cl. X.R.

65—234, 261, 359, 360, 361